United States Patent
Jeon

(10) Patent No.: US 8,385,890 B2
(45) Date of Patent: *Feb. 26, 2013

(54) WIRELESS DATA SERVICE APPARATUS AND METHOD IN BROADCAST MOBILE COMMUNICATION SYSTEM

(75) Inventor: Hyo Sig Jeon, Suwon-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/403,940

(22) Filed: Feb. 23, 2012

(65) Prior Publication Data

US 2012/0157057 A1 Jun. 21, 2012

Related U.S. Application Data

(63) Continuation of application No. 11/503,729, filed on Aug. 11, 2006, which is a continuation of application No. 10/309,162, filed on Dec. 4, 2002, now Pat. No. 7,203,480.

(30) Foreign Application Priority Data

Dec. 5, 2001 (KR) .................. 2001/76576

(51) Int. Cl.
*H04H 20/71* (2008.01)
*H04M 1/66* (2006.01)
*H04M 3/42* (2006.01)
*H04W 4/00* (2009.01)
*H04L 12/28* (2006.01)

(52) U.S. Cl. ....... 455/411; 455/3.05; 455/410; 455/415; 455/466; 370/394

(58) Field of Classification Search ........ 455/2.01–2.02, 455/3.05–3.06, 410–411, 414.1–414.4, 432.3, 455/435.1, 41.3, 520, 550.1, 560–561, 3.02, 455/406, 415, 418–420, 423–425, 466, 556.2; 380/200, 205–207, 239, 247–250, 262, 267, 380/270, 272, 37, 42–43, 44–45, 439, 259, 380/284; 726/2, 21, 26; 725/30–31, 62, 136; 370/252, 328, 338, 349, 394; 713/160, 162–167; 348/425.2, 465–466; 714/52, 701, 746, 748

See application file for complete search history.

(56) References Cited

U.S. PATENT DOCUMENTS

| | | | | |
|---|---|---|---|---|
| 5,887,252 | A * | 3/1999 | Noneman | 455/463 |
| 6,104,709 | A | 8/2000 | Rinchiuso et al. | |
| 6,330,699 | B1 * | 12/2001 | Yoshioka et al. | 714/746 |
| 6,463,285 | B1 * | 10/2002 | Davies et al. | 455/436 |
| 6,496,928 | B1 * | 12/2002 | Deo et al. | 713/153 |
| 6,556,835 | B1 * | 4/2003 | Raivisto | 455/466 |
| 6,738,905 | B1 * | 5/2004 | Kravitz et al. | 713/194 |
| 7,076,654 | B2 * | 7/2006 | Kawamoto | 713/163 |
| 7,155,517 | B1 * | 12/2006 | Koponen et al. | 709/227 |
| 7,203,480 | B2 * | 4/2007 | Jeon | 455/411 |
| 7,567,793 | B1 * | 7/2009 | Saito et al. | 455/403 |

* cited by examiner

*Primary Examiner* — Meless Zewdu

(74) *Attorney, Agent, or Firm* — Lee, Hong, Degerman, Kang & Waimey

(57) ABSTRACT

A system for broadcasting wireless data service in a mobile communication system includes sending a request call for a wireless data service from a mobile terminal to a mobile switching center, identifying whether the terminal is registered in the mobile switching center, transmitting authentication code information indicating that the terminal is registered in the base transceiver station, and releasing the corresponding call in the terminal receiving the authentication code information and receiving the wireless service data. The authentication code information may include a Walsh code and a long code necessary for allowing the terminal to reconstitute the data. Through this case information, the system can broadcast wireless service data throughout an entire region and be assured that only mobile terminals storing compatible code information will be able to access the data.

12 Claims, 5 Drawing Sheets

WIRELESS DATA SERVICE APPARATUS AND METHOD IN BROADCAST MOBILE COMMUNICATION SYSTEM

CROSS-REFERENCE TO RELATED APPLICATIONS

This application is a continuation of U.S. application Ser. No. 11/503,729, filed on Aug. 11, 2006, currently pending, which is a continuation of U.S. application Ser. No. 10/309,162, filed on Dec. 4, 2002, now U.S. Pat. No. 7,203,480, which claims the benefit of earlier filing date and right of priority to Korean Application No. 76576/2001, filed on Dec. 5, 2001, the contents of which are hereby incorporated by reference herein in their entirety.

BACKGROUND OF THE INVENTION

1. Field of the Invention

The present invention relates to a wireless data service in a mobile communication system, and more particularly to a system and method for providing a wireless data service in a broadcast mobile communication system without any limitation of system resources regarding the number of terminals in use.

2. Background of the Related Art

The concept of providing cellular mobile communications in a coverage area divided into cells was developed by Bell Laboratories at the end of the 1960s. In 1983, the FCC, in controlling the development of the first generation analog mobile communications system, assigned 666 bi-directional channels of 800 MHz for the US AMPS (Advance Mobile Photo Services).

In 1991, US Digital Cellular (IS-54) was made available as a second-generation analog mobile communication system. This standard was based on a TDMA (time division multiple access) system using $\pi/4$ DQPSK (differential quadrature phase shift keying) digital modulation mode capable of assigning three users per 30 KHz channel by the AMPS, which is the Fm/FDMA (frequency division multiple access) mode. Application of the half-rate coding technique and the digital signal process at the same time has made it possible to process six users in a same bandwidth of 30 KHz.

The above-mentioned mobile communication technology continues to develop at a fast rate, and has resulted in the IMT-2000 which is the mobile communication system for the next generation. This system and others like it not only carry text and voice but also moving picture data. As the demand for wireless telephones increases, providing voice and data services to mobile terminal units will become a necessity.

A wireless data service should provide all services that are provided in existing PSTNs (public switched telephone network) and PSDNs (packet data service node), including information search, internet connection, enterprise computer connection, and facsimile transmission/receipt through a PC communication connection in addition to traditional file transmission. These basic services have spawned the development of a new class of specialized services, including transmitting field reports of new media, transmitting/receiving e-mails, and transmitting business reports of outdoor service employees such as insurance canvassers or A/S employees.

FIG. 1 is a block diagram illustrating a mobile communication system of a conventional wireless data service. The system includes a mobile communication terminal 10 such as a notebook, a PDA and/or a cellular phone which receives a wireless data service through the wireless communication system; a mobile communication system (A) including a base transceiver station (BTS) 20 for performing wireless communications with the mobile communication terminal 10, a base station controller (BSC) 30 connected to the base transceiver station 20 for controlling each base transceiver station, and a mobile switching center (MSC) 40 connected to a number of base station controllers 30 for controlling the whole system. Also included is an inter-working function/packet data service node (MN or PSDN) 50 which is connected to the mobile switching center 40 for providing the wireless data service. The inter-working function/packet data service node 50 may be connected to a data service center 60 or the Internet, to thereby provide the data required by a user. For illustrative purposes, the inter-working function/packet data service node is shown connected to the Internet to provide the data that the user requires.

FIG. 2 is a flow chart illustrating the operation sequence of a wireless data service method in the conventional mobile communication system. In a first step, if the mobile communication terminal 10 sends a call to request a wireless data service and terminal information to the base transceiver station 20 (S11), the base transceiver station 20 assigns a basic channel to the mobile communication terminal 10 (S12) and transmits a corresponding call to the base station controller 30 to request data from the inter-working function/packet data service node 50 in the base station controller 30 (S13).

The base station controller 30 also assigns channels according to the volume of wireless data requested by the mobile communication terminal 10 to provide the data (S14). The mobile communication terminal 10 receives the data through the connected channels (S15).

The above-mentioned mobile communication system has been developed as a mobile communication system to support the CDMA 2001x standard, which forms a basis for providing wireless remote multimedia casting service in the IMT-2000 network. In providing this service, a request for moving picture data is performed by establishing a connection to the wireless internet and selecting the wireless data service through a web browser in the terminal where the IMT-2000 service is receivable. In response to this request, a multicast group is logged in the inter-working function/packet data service node in the IMT-2000 network, a multicast tree is formed among each of the group sources, moving picture information transmitted from the inter-working function/packet data service node is compressed and encoded, and the information is transmitted to the terminal. The moving picture and voice information can then be provided through the wireless internet in a number of terminals, by using the multicast mode wherein the terminal receiving the data transmits the data to another terminal connected with the multicast tree and by reducing a use of the system resources.

The above-mentioned technique has the effect of reducing the load of the system resources, compared to the unicast mode of sending data to one specific person. However, as the number of subscribers of the mobile communication increase, the conventional wireless data service method may not be able to provide all subscribers with requested data services due to limited system resources. These limited system resources include the mode of assigning channels based on data service requests by mobile communication terminals and transmitting data.

Further, even though data is transmitted and received using the multicast mode, the point-to-point mode of transmitting data is restricted because it is unable to consistently provide a variety of data at a time to a lot of subscribers. In providing wireless data services, conventional systems also require additional equipment such as the inter-working function/ packet data service node. This increases the cost and complexity of the system.

SUMMARY OF THE INVENTION

An object of the invention is to solve at least the above problems and/or disadvantages and to provide at least the advantages described hereinafter.

It is an object of the present invention to provide a system and method for providing a broadcast wireless data service in a mobile communication system, in which a particular code is transmitted to a terminal receiving a broadcast wireless data service and the wireless data is transmitted in the broadcasting mode such that only the terminal having the particular code information can selectively receive, reconstitute, and output the data to a user. By using codes of this type, wireless data may be provided to a plurality of terminals at the same time and without any additional equipment or restrictions on system resources. The invention, thus represents a substantial improvement over conventional systems, which are restricted in terms of system resources and the necessity of having to set up channels between respective mobile terminals and base stations on a one-to-one basis before data can be provided.

To achieve these and other objects, a broadcast wireless data service apparatus of the mobile communication system according to the present invention comprises a terminal for providing a broadcast wireless data service, a base transceiver station for serving a wireless communication with the terminal, a base station controller for controlling the base transceiver station, a mobile communication system including a central control station for controlling the base station controller, performing a subscriber authentication process and a resource allocation to provide the broadcast wireless data service, and a broadcast center for providing the wireless data transmitted from the central control station of the mobile communication system.

In another aspect of the present invention, there is provided a broadcast wireless data service method of the mobile communication system according to the present invention comprises the steps of receiving wireless data from the broadcast center to broadcast the wireless data on predetermined specific time or date in the central control station of the mobile communication system, determining whether or not an authentication process of the wireless data is necessary and assigning an encryption code and authentication code if necessary, transmitting the encryption code and authentication code to the base transceiver station and transmitting the wireless data from the broadcast center to the base transceiver station, and broadcasting the wireless data received in the base transceiver station into the communication area.

Further, the method further includes the steps of receiving the broadcasting wireless data; receiving a request call for the broadcast wireless data service from the mobile communication terminal in the base transceiver station, determining whether or not the wireless data broadcast, and transferring the service request call to the central control station in case of broadcasting the wireless data, informing a determination on whether or not a corresponding mobile communication terminal is registered to the base transceiver station in the central control station, certifying whether or not the mobile communication terminal received from the central control station is registered in the base transceiver station, and transmitting the authentication information and the encryption code information to the corresponding mobile communication terminal if the mobile communication terminal is registered, and receiving the broadcasting wireless data services using the authentication information and the encryption code received in the mobile communication terminal.

As mentioned above, according to the present invention, it is not that channels are assigned by the mobile communication terminals to transmit the respective data but that wireless data are broadcast in the broadcast center through the base transceiver station, the Walsh code and long code mask key enciphering the broadcast wireless data are provided only the authenticated terminals, thereby enabling to provide the wireless data service to a number of terminals at a time without any restriction of the system resources and enabling to provide the wireless data service with only the mobile communication system without any additional equipment constitution for the data service.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

A preferred embodiment of the present invention will now be described with reference to the accompanying drawings.

Figure 1:
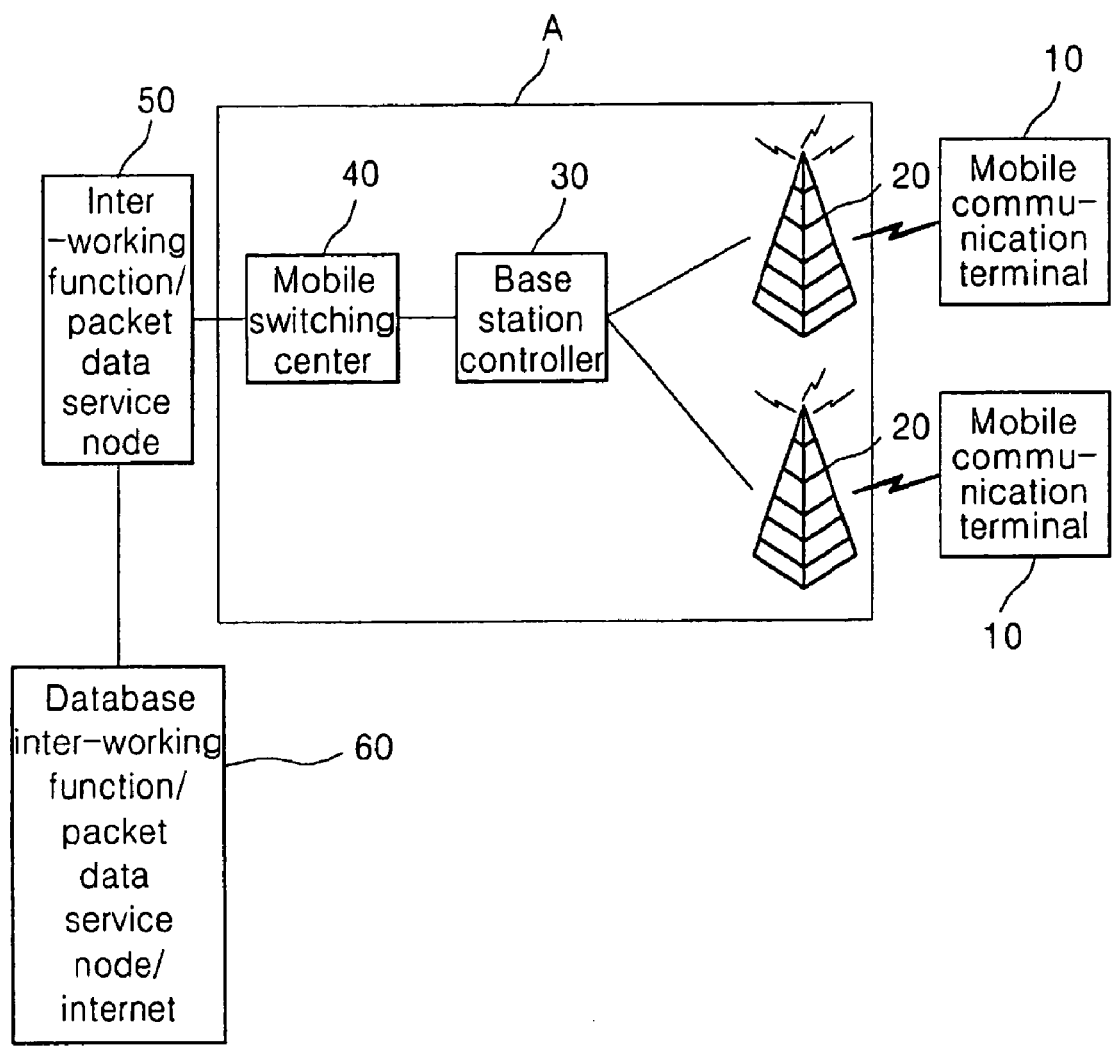
FIG. 1 is a block diagram illustrating the constitution of a mobile communication system of a conventional wireless data service.
Figure 2:
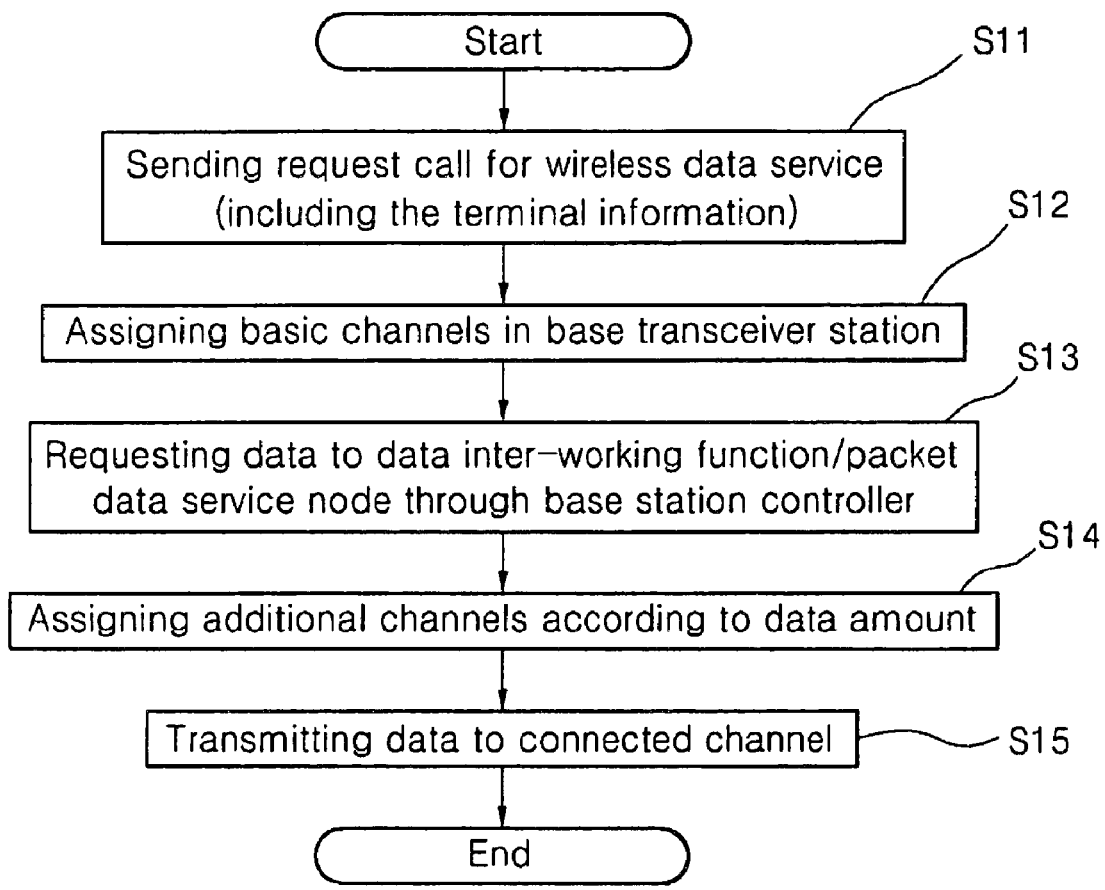
FIG. 2 is a flow chart illustrating the operation sequence of a wireless data service method in a conventional mobile communication system.
Figure 3:
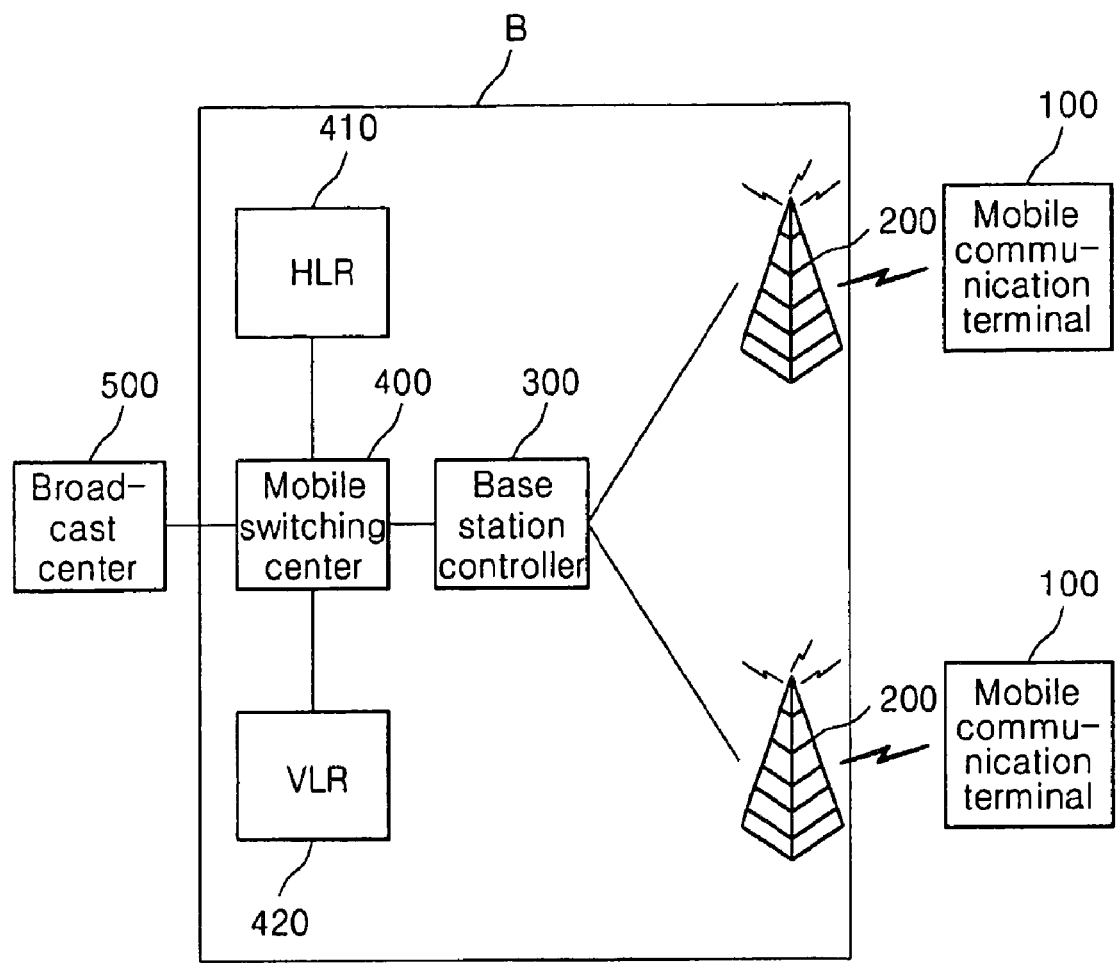
FIG. 3 is a block diagram illustrating the constitution of a broadcast wireless data service apparatus of a mobile communication system according to a preferable embodiment of the present invention.

FIG. 3 is a block diagram showing a system for providing broadcast wireless data service in a mobile communication system according to a preferred embodiment of the present invention. This apparatus includes a mobile communication terminal 100 such as a notebook, a PDA or a cellular phone for receiving wireless data from a mobile communication system (B), a base transceiver station (BTS) 200 for performing wireless communications with the mobile communication terminal 100, a base station controller (BSC) 300 connected to the base transceiver station 200 for controlling each base transceiver station 200, and a mobile switching center (MSC) 400 connected to a number of the base station controllers 300 for controlling the whole system. The system further includes a home location register (HLR) 410 and a visitor location register (VLR) 420 which perform an authentication process of the mobile communication terminal 100, and a broadcast center 500 connected to the mobile communication system (B) for providing broadcast data for the wireless data service.

The wireless data provided in broadcast center 500 is transmitted to mobile switching center 400 of the mobile communication system (B). If the wireless data received from the broadcast center is charged service data requiring authentication, the mobile switching center 400 assigns a Walsh code and a long code mask key as the authentication code informs the base transceiver station 200 of this code, and transmits the wireless data to the base transceiver station. In the base transceiver station 200, the wireless data is enciphered using the authentication code as received and then broadcast at the maximum output.

To receive the wireless data as broadcast above, a message requesting the wireless data service is transmitted from the mobile communication terminal 100 to the base transceiver station 200, and authentication from HLR 410 and VLR 420 of the mobile switching center 400 is completed. The authentication code information is then received from the base transceiver station 200 and the wireless data service is provided.

For the aforementioned authentication process, the mobile communication terminal 100 may request use of the wireless data service and is preferably registered in the HLR 410/VLR 420 of the mobile switching center 400. The HLR 410 is a data base management server which stores subscriber information collected, for example, when the terminal was purchased and number information corresponding to the subscriber. The server also stores authentication information for the terminal as well as service information. The VLR 420 is a data base management server which newly generates and stores subscriber information by areas in regular units when the subscriber moves. The HLR 410 and the VLR 420 thus manage the subscriber's location and number information and the terminal authentication information by exchanging the necessary information and updating the database accordingly.

Figure 4:
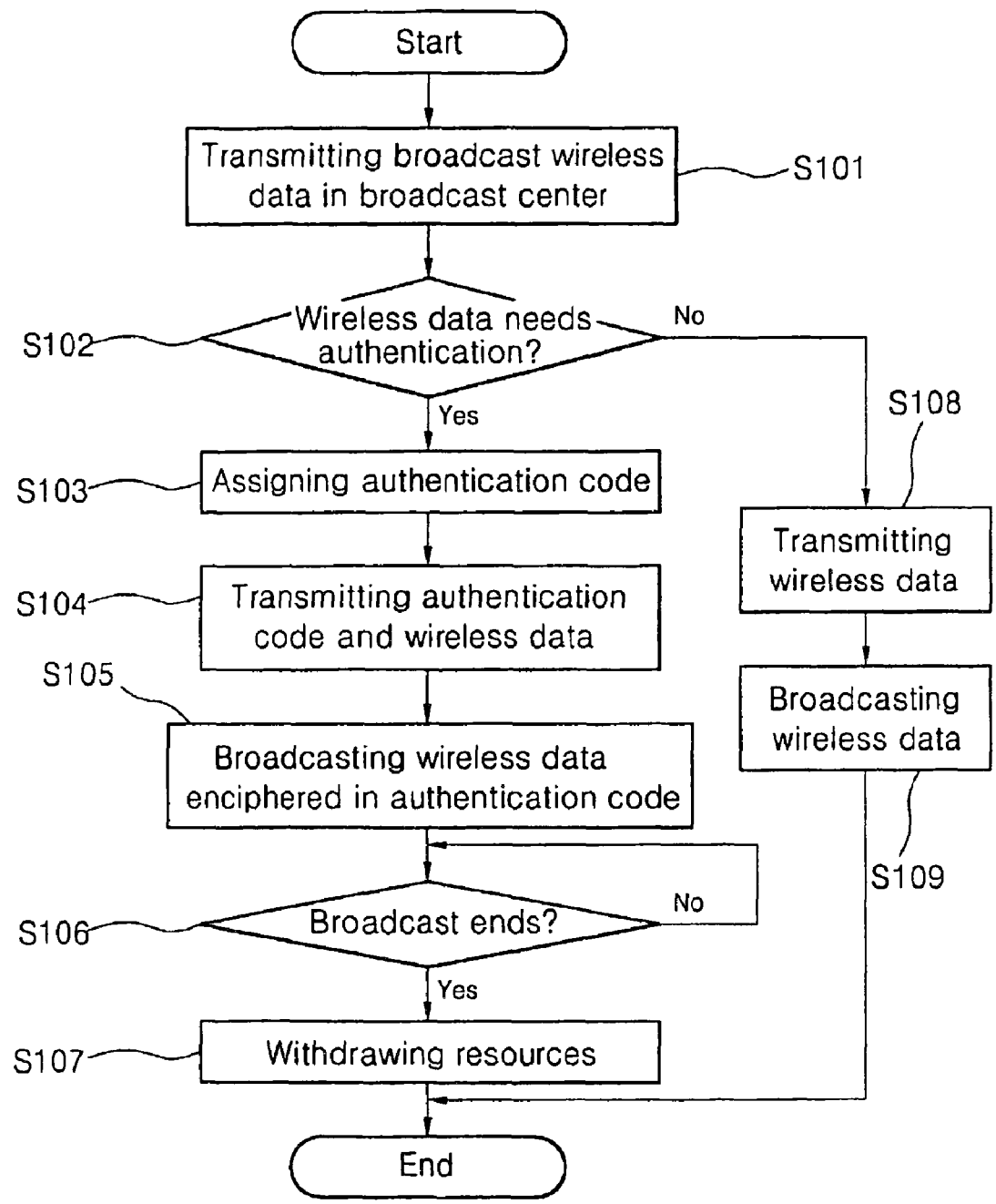
FIG. 4 is a flow chart illustrating the operation sequence of a wireless data broadcast of a broadcast wireless data service method in a mobile communication system according to a preferable embodiment of the present invention.

FIG. 4 is a flow chart showing steps included in an operation sequence of a wireless data broadcast in a mobile communication system according to a preferred embodiment of the invention. Initially, the broadcast center 500 provides broadcast wireless data to the mobile switching center 400 of the mobile communication system (B) at a regularly scheduled time or all day (S101).

The mobile switching center 400 receiving the broadcast wireless data determines whether or not the received wireless data is a charged service requiring authentication (S102). If it is a charged service which requires authentication, the mobile switching center 400 assigns a Walsh code and a long code mask key which are included as authentication code information used to restrict access of the service to only the mobile communication terminal 100 (S103).

The Walsh codes include 64 kinds which are orthogonal to each other to distinguish each channel in the CDMA system, and each Walsh code is made of 64 bits. Channels by the Walsh code are divided into 64 kinds such as W0, W1, W3 . . . W63, in which the pilot channel is W0, the synchronizer channel is W32, the call channels are W1~W7, the conversation channels are W8~W63 (except for W32). The call channels and the synchronizer channel are not assigned, and W1~W63 may be used as the conversation channels.

Since the Walsh code has orthogonal characteristics, it can be obtained +1 only in the case of multiplying the same Walsh code. Therefore, the 64 Walsh codes are all independent, thereby dividing into 64 channels. A receiving party can recognize the same channel and then receive the data only if that party's terminal uses a Walsh code having the value of +1 when multiplying the 64 bit-Walsh codes.

The long code mask key is used for a reverse direction channel. A long code is used when the base transceiver station distinguishes each subscriber. This long code can be specifically assigned to each terminal because it uses ESN information of the mobile communication terminal.

By using the aforementioned Walsh code and the long code mask key, the present invention advantageously limits reception of the broadcast wireless data to only the mobile communication terminal 100 as authenticated. The mobile switching center 400 assigns the Walsh code and long code mask key at previous step S103, and then transmits the assigned Walsh code and long code information and the wireless data to the base transceiver station 200 (S104). The base transceiver station 200 then enciphers the wireless data using the Walsh code and long code and broadcasts the wireless data at the maximum output (S105).

Although the wireless data as broadcast above is receivable in all mobile communication terminals, since it is impossible to reconstitute the data in a terminal which does not have the specific Walsh code and long code information, access to the service is restricted.

The base transceiver station 200 may encipher the wireless data broadcast in the broadcast center 500 at a regular time or all day and broadcasts it in case of charged service, but broadcasts the data without any encryption process in case of free service. Since the base transceiver station 200 broadcasts the wireless data at the maximum output so that all the mobile communication terminals can receive it, in general, providing the broadcast wireless data service at the time when there is no telephone traffic may result in higher efficiency.

In the case that the data provided in the broadcast center 500 is free, the data is transmitted to the base transceiver station 100 (S108) without enciphering (S109), so that it can be received and used in all of the mobile communication terminals. The broadcast wireless data is conformable to the standardized data format as set in the system, and the data is assigned the order and broadcast.

Giving the order to the data makes it easy to find out any duplicate errors or any lost error data when a part of data is lost by any hand-off in the mobile communication terminal 100 or any duplicate error or lost error in data. In the present invention, the error data is disregarded and the next sequence is processed.

In addition, when broadcast of the broadcast wireless data as the charged service is ended (S106), the resource assigned as the Walsh code and long code mask key in the mobile switching center 400 is withdrawn (S107) and the broadcast is ended.

Figure 5:
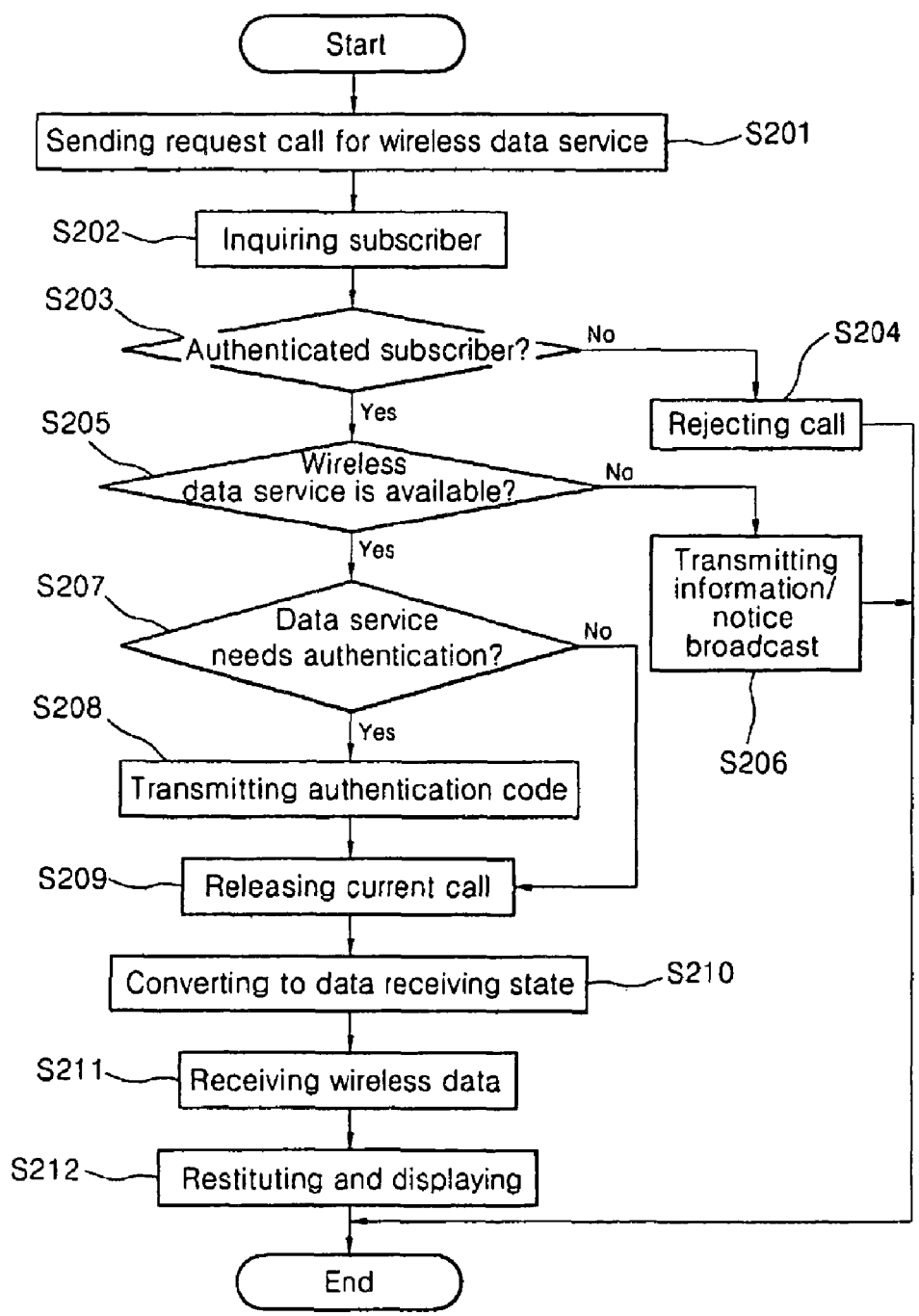
FIG. 5 is a flow chart illustrating the operation of receiving a wireless data broadcast of a broadcast wireless data service method in a mobile communication system according to a preferable embodiment of the present invention.

FIG. 5 is a flow chart showing steps included in an operation of receiving a wireless data broadcast in a mobile communication system according to a preferred embodiment of the invention. Initially, the mobile communication terminal 100 sends a call requesting a wireless data service (S201). The request may include information indicating a service option or service number for wireless data service. The base transceiver station 200 receiving the call transmits the call to the mobile switching center 400 through the base station controller 300. The mobile switching center 400 performs a subscriber inquiry to determine whether a user of the mobile communication terminal 100, or the mobile terminal itself, is registered (S202). The mobile switching center then identifies whether or not the user is the registered subscriber (S203) based on results of this inquiry.

In this regard, it is noted that in order to access the wireless data service the user of the mobile communication terminal 100 is preferably registered in advance in a database of the mobile communication system. Further, the subscriber inquiry may be performed in the mobile communication system (B) using the registered data in order to determine whether the user is the registered subscriber in the HLR 410 or the VLR 420 connected to the mobile switching center 400. This may be performed by analyzing the number given to the corresponding subscriber; and then determining whether the terminal number and the electronic serial number (ESN) specifically given to the terminal are identified with each other if the user is subscribed. It then may be determined whether the user is a normal subscriber. The call may be rejected or connected on this basis.

In a registration process to use the data service, basically a subscriber inquiry uses the HLR 410 and the VLR 420 in the same manner as a request for an ordinary voice service, comparing the subscriber number and the ESN. In this regard, the PPP authentication may be additionally performed, which makes "ON" so that the authentication can be performed in the PSDN or IWF.

The mode of requesting the wireless data service using the mobile communication terminal 100 in S201 can be explained in two main cases, one using a service option and the other using a specific received number.

The service option is used when requesting a call by a wireless data service. Each of the service options of 8K/13K/64K/144K is requested according to the data rate setting the mobile communication terminal 100, and a corresponding broadcast service is used by defining a specific service option.

The received number is used when a businessman requests a call for a voice or packet data service by selecting a specific received number. For instance, if any call is sent having the receiving number such as *019 or #019, the wireless data service is provided.

After the subscriber authentication process is completed, if a user is a registered subscriber with respect to his mobile communication terminal 100, it is determined whether the data service requested by the subscriber is available (S205). If the data service is not available, information indicating service unavailability is provided to the mobile communication terminal 100 through a notice broadcasting or text service (S206).

In the case of a broadcast wireless data service, when the broadcast center does not continuously provide the wireless data, that is, it provides the wireless data for a regular time only, the above mentioned steps (S205, S206) fall under the case that the service time passes or the subscriber requests for the service not being provided in the present location. As a result of identification at S203, if the mobile communication 100 is not registered, the call is rejected (S204).

When wireless data service is possible in S205, it is determined whether the wireless data service requested by the subscriber is the charged service requiring authentication (S207). In the case of the charge service, the base transceiver station 200 transmits the Walsh code and long code mask key as the authentication code to the terminal with a completed authentication (S208).

The mobile communication terminal 100 receiving the Walsh code and long code mask key releases the currently connected call (S209), converts into an available state that of receiving the data (S210), receives the wireless data broadcast in the base transceiver station 200 (S211), reconstitutes it based on the Walsh code and long code mask key as received at S208 and displays and provides the same to the user (S212).

At this time, any lost or duplicate data by any hand-off or error in channels are found because the data is given the order and it is broadcast accordingly as previously mentioned. The data causing any error is disregarded and the data in the next sequence is continuously processed.

Therefore, even if the wireless data is broadcast through the base transceiver station, since only the authenticated terminal can receive the data from the base transceiver station and reconstitute it, even the wireless data by the charged service may be broadcast through the regular channels. This enables to save the resources and makes it possible for a number of terminals to be provided the service at a time.

In summary, a broadcast wireless data service apparatus and method according to the present invention does not assign channels by terminals or transmit data respectively. Instead, the invention transmits Walsh code and long code mask key information to a terminal requesting the wireless data, as broadcast through the base transceiver station in the broadcast center, so that the subscribers freely receive the data. This allows a number of terminals to receive the wireless data service without any restriction of system resources at the same time, and provides the wireless data service without any additional data service equipment.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

The invention claimed is:

1. A method of receiving service data at a mobile terminal, the method comprising:
   sending, to a network, a request message to request particular service data from the network;
   receiving, from the network prior to receiving of the particular service data, key information to be used for decrypting the particular service data, wherein the receiving of the key information is in response to the sending of the request message, and wherein the receiving of the key information is via a bi-directional communication service;
   receiving, from the network, the particular service data via a broadcasting service, the particular service data including sequence information assigned by the network, wherein the particular service data has been encrypted using code information; and
   decrypting the particular service data based upon the received key information, wherein the mobile terminal performs the decrypting only after the mobile terminal has received the key information, and
   wherein the sequence information is used for detecting duplicate data errors associated with the particular service data.

2. The method of claim 1, wherein the mobile terminal performs the decrypting after the mobile terminal is authenticated by the network.

3. The method of claim 1, wherein the sequence information is further used for detecting lost error data occurring when a part of the service data is lost due to hand-off.

4. The method of claim 1, wherein the request message comprises information indicating a service option for the particular service data.

5. The method of claim 1, wherein the sequence information is related to an order of the service data.

6. The method of claim 1, wherein the sequence information is related to an order of the service data.

7. The method of claim 1, wherein the particular service data is a point-to-multi-point service data to be accessed by a plurality of mobile terminals comprising the mobile terminal in a same communication network.

8. A mobile terminal comprising:
 a transceiver configured to send and receive signals to and from a network; and
 a processor cooperating with said transceiver and configured to cause:
  sending, to the network, a request message to request a particular service data from the network;
  receiving, from the network prior to receiving of the particular service data, key information to be used for decrypting the particular service data, wherein the key information is received in response to the sending of the request message, and wherein the receiving of the key information is via a bi-directional communication service;
  receiving, from the network, the particular service data via a broadcasting service, the particular service data including sequence information assigned by the network, wherein the particular service data has been encrypted using code information; and
  decrypting the particular service data based upon the received key information, wherein the mobile terminal performs the decrypting only after the mobile terminal has received the key information, and
 wherein the sequence information is used for detecting duplicate data errors associated with the particular service data.

9. The mobile terminal of claim 8, wherein the processor is further configured to cause the decrypting after the mobile terminal is authenticated by the network.

10. The mobile terminal of claim 8, wherein the sequence information is further used for detecting lost error data occurring when a part of the service data is lost due to hand-off.

11. The mobile terminal of claim 8, wherein the request message comprises information indicating a service option for the particular service data.

12. The mobile terminal of claim 8, wherein the sequence information is related to an order of the service data.

* * * * *